(12) United States Patent
Sandoval et al.

(10) Patent No.: US 10,728,034 B2
(45) Date of Patent: Jul. 28, 2020

(54) SECURITY PRIVILEGE ESCALATION EXPLOIT DETECTION AND MITIGATION

(71) Applicant: Webroot Inc., Broomfield, CO (US)

(72) Inventors: Andrew Sandoval, San Antonio, TX (US); Eric Klonowski, Broomfield, CO (US)

(73) Assignee: WEBROOT INC., Broomfield, CO (US)

( * ) Notice: Subject to any disclaimer, the term of this patent is extended or adjusted under 35 U.S.C. 154(b) by 227 days.

(21) Appl. No.: 15/903,303

(22) Filed: Feb. 23, 2018

(65) Prior Publication Data
US 2019/0268152 A1 Aug. 29, 2019

(51) Int. Cl.
*H04L 9/32* (2006.01)
*G06F 21/50* (2013.01)
*G06F 9/445* (2018.01)

(52) U.S. Cl.
CPC ........ *H04L 9/3213* (2013.01); *G06F 9/44521* (2013.01); *G06F 21/50* (2013.01)

(58) Field of Classification Search
CPC ..... H04L 9/3213; G06F 9/44521; G06F 21/50
USPC ......................................................... 713/167
See application file for complete search history.

(56) References Cited

U.S. PATENT DOCUMENTS

| | | | | |
|---|---|---|---|---|
| 8,572,716 | B2 * | 10/2013 | Chander | G06F 21/335 726/10 |
| 9,250,811 | B1 * | 2/2016 | Patiejunas | G06F 3/061 |
| 2005/0055579 | A1 * | 3/2005 | Kanda | H04L 63/20 726/4 |
| 2006/0107037 | A1 * | 5/2006 | Lincoln | G06F 21/12 713/155 |
| 2007/0014397 | A1 * | 1/2007 | Ukeda | G06F 21/10 380/30 |
| 2008/0133756 | A1 * | 6/2008 | Taylor | H04L 67/02 709/227 |
| 2012/0210415 | A1 * | 8/2012 | Somani | H04L 63/0884 726/9 |
| 2015/0101044 | A1 * | 4/2015 | Martin | G06F 21/552 726/22 |

* cited by examiner

*Primary Examiner* — Michael S McNally
(74) *Attorney, Agent, or Firm* — Sprinkle IP Law Group

(57) ABSTRACT

Examples of the present disclosure describe systems and methods for monitoring the security privileges of a process. In aspects, when a process is created, the corresponding process security token and privilege information is detected and recorded. At subsequent "checkpoints," the security token is evaluated to determine whether the security token has been replaced, or whether new or unexpected privileges have been granted to the created process. When a modification to the security token is determined, a warning or indication of the modification is generated and the process may be terminated to prevent the use of the modified security token.

18 Claims, 4 Drawing Sheets

SECURITY PRIVILEGE ESCALATION EXPLOIT DETECTION AND MITIGATION

BACKGROUND

Various forms of malware utilize vulnerabilities in operating system code to enable attackers to access and modify the security privileges available to a process, application or service. In many instances, such vulnerabilities enable shellcode to execute in a high-privileged, secured mode. Attackers customize the shellcode to steal or provide access to security information for high-privileged system processes. The stolen security information is used to replace the security information for a low-privileged process, thereby exploiting a "privilege escalation" vulnerability in the system.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for monitoring the security privileges of a process. In aspects, when a process is created, the corresponding process security token and privilege information is detected and recorded. At subsequent "checkpoints," the security token is evaluated to determine whether the security token has been replaced, or whether new or unexpected privileges have been granted to the created process. When a modification to the security token is determined, a warning or indication of the modification is generated and the process may be terminated to prevent the use of the modified security token.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
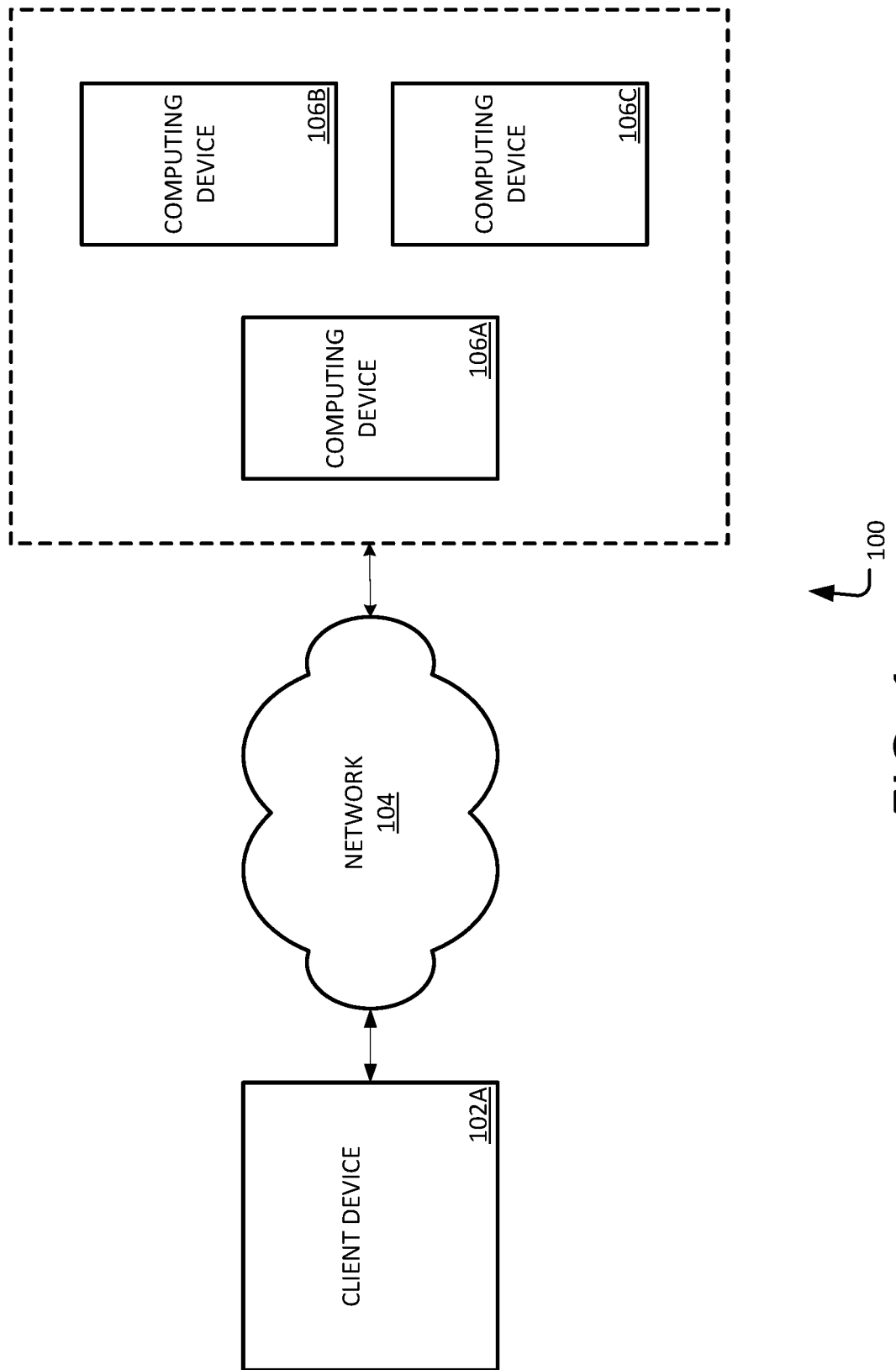
FIG. 1 illustrates an overview of an example system for monitoring the security privileges of a process as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for monitoring the security privileges of a process. In aspects, a computing system may comprise (or have access to) a mechanism to register for and receive notifications of process and thread creation, dynamic link library (DLL) loading, files system and registry activity (e.g., reads, writes, etc.), process and thread handle opening and duplication. Upon receiving such a notification, the primary security token of a corresponding process may be obtained and the address of the security token may be tracked. Additional information may also be obtained/tracked, such as the initial privilege level of the process, the current privilege level of the process, a current integrity level, an application container identifier, etc. At various checkpoints, the current security token of a process may be evaluated. The evaluation may comprise verifying the address of the security token, evaluating a list of processes and permitted execution levels/privileges, etc. If the evaluation determines that one or more attributes or portions of the current security token have been modified, one or more corrective actions may be taken. In examples, such corrective actions may include generating warnings and/or notification of the security token modification, removing the modified security token, replacing the modified security token with a previous version of the security token, terminating one or more corresponding processes, quarantining one or more files, executing anti-exploit software/services, etc.

Accordingly, the present disclosure provides a plurality of technical benefits including but not limited to: detecting and recording an original process security token and corresponding privileges of a process at process creation; evaluating the integrity of the process security token over numerous checkpoints during (and prior to) process execution; evaluating the privilege level and permitted access during process execution; increasing system security by preventing rootkits and other malware from gaining unauthorized control of a device; performing automatic corrective action when security token modifications are detected, among other examples.

FIG. 1 illustrates an overview of an example system for monitoring the security privileges of a process, as described herein. Example system 100 presented is a combination of interdependent components that interact to form an integrated whole for monitoring the security privileges of a process. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 4. In other examples, the components of systems disclosed herein may be spread across multiple devices. For instance, input may be entered or detected on a client device and information may be processed or accessed from other devices in a network, such as one or more server devices.

As one example, the system 100 comprises client devices 102A, distributed network 104, and distributed server environment comprising computing devices 106A-C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client device 102 may comprise an operating system configured to be operated in one or more protection modes. The various protection modes may provide different levels of access to hardware and software resources of client device 102. Examples of protection modes may include kernel mode, device driver mode, user mode and the like. The operating system may comprise (or have access to) one or more software security features. For example, the operating system may have access to a software package that provides for registering for and receiving various notifications from the operating system. In some aspects, the software package may be implemented locally on client device 102. In other aspects, client device 102 may access the software package on one or more remote devices, such as computing devices 106A-C, using network 104. The notifications received by (or in accordance with) the software package may indicate the creation of processes and threads, the loading of DLLs, file system and registry activity, process- and thread-handling events, etc. Upon detecting the receipt or generation of a notification, client device 102 may process the notification. Processing the notification may include identifying a primary security token of a process corresponding to the notification. A security token, as used herein, may refer to an object that is associated with a user, a set of data, one or more processes, and/or a security context. The security context of a process may refer to a set of credentials for a process (or the user that created the process). Processing the notification may further include tracking the security token address or identifier, the initial privilege level of the process, the current privilege level of the process, a current integrity level of the token, an execution environment identifier, etc.

In aspects, client device 102 may use the software package described above to evaluate the current state of a security token at various checkpoints. Examples of checkpoints may include process creation notification, thread creation notification, library file load (image load) notification, registry access callbacks, file system access callbacks, object manager callbacks (process and thread handle opening, duplication, etc.), virtual memory operation checks from user-mode hooks, user-mode hooks for endpoint protection, etc. Evaluating the current state of a security token may comprise verifying the security token address/identifier, assessing a list (e.g., a whitelist, blacklist, etc.) of processes and corresponding execution levels/privileges, checking an identifier of the execution environment, etc. In aspects, if the evaluation determines that one or more attributes or portions of the current security token have been modified, client device 102 may perform one or more corrective actions. Corrective actions may include generating warnings and/or notifications of the security token modification, removing the modified security token, replacing the modified security token with a previous version of the security token, terminating one or more corresponding processes, quarantining one or more files, executing anti-exploit software/services, etc. In examples, the corrective actions may be performed locally by client device 102, remotely by computing devices 106A-C, or some combination thereof.

Figure 2:
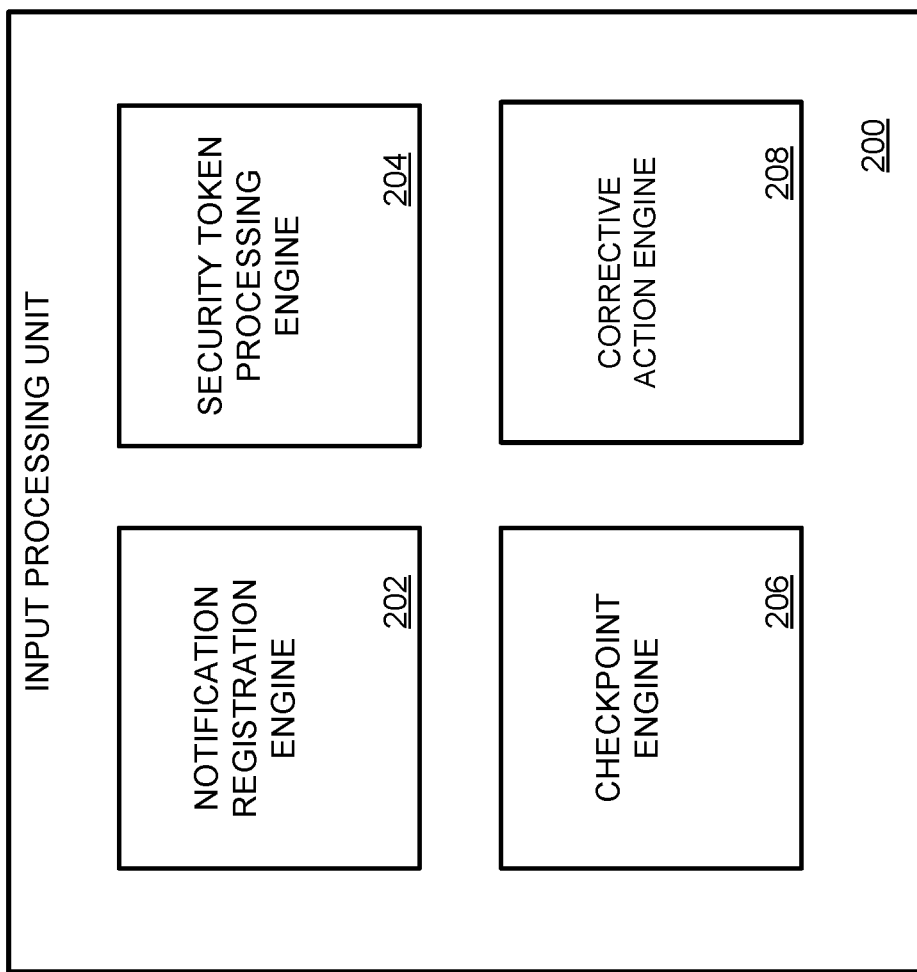
FIG. 2 illustrates an exemplary input processing unit for monitoring the security privileges of a process as described herein.

FIG. 2 illustrates an overview of an exemplary input processing unit 200 for monitoring the security privileges of a process, as described herein. The security privilege monitoring techniques implemented by input processing unit 200 may comprise the processing techniques and content described in FIG. 1. In alternative examples, a distributed system (comprising one or more components such as processor and/or memory) may perform processing described in system 200.

With respect to FIG. 2, input processing unit 200 may comprise computing notification registration engine 202, security token processing engine 204, checkpoint engine 206, and corrective action engine 208. Notification registration engine 202 may comprise or be configured to access one or more components for registering for and receiving various notifications from the operating system of input processing unit 200. In a particular example, such components may include anti-exploit code and services that are locally or remotely accessible by input processing unit 200. The notifications received by notification registration engine 202 may indicate various detected conditions or events. For example, the notifications may indicate the creation of processes and threads, the loading of DLLs, file system and registry activity, process- and thread-handling events, virtual memory operations, etc. In some aspects, the notification may comprise a security token or access token. The security/access token may be associated with a security context describing a set of credentials for a process (or the user that created the process). In examples, the set of credentials may specify a permitted security level at which the process may be executed, a required or initial integrity level of a process, an execution environment identifier for the process, users authorized to execute the process, system resources accessible to the process, etc.

Security token processing engine 204 may be configured to process a security token or access token. In aspects, security token processing engine 204 may have access to notification registration engine 202 and/or the notifications received by notification registration engine 202. Upon identifying a received notification, security token processing engine 204 may identify and/or obtain a security/access token for one or more processes corresponding to the notification. In examples, identifying a security/access token may include parsing a notification, searching a security/access token data store, accessing a token generating or issuing authority, or the like. After identifying a security/access token, notification registration engine 202 may process the security/access token. Processing the security/access token may comprise determining and tracking the security/access token address or identifier, identifying the initial privilege level of a corresponding process, identifying an initial integrity level of the token, identifying an execution environment identifier, etc. In some aspects, notification registration engine 202 may store a processed (e.g., initial) security/access token or one or more portions thereof in a data store accessible to input processing unit 200.

Checkpoint engine 206 may be configured to evaluate the current state of a security token at various checkpoints. In aspects, checkpoint engine 206 may have access to notification registration engine 202 and/or the notifications received by notification registration engine 202. A notification may correspond to one or more "checkpoints." Examples of checkpoints may include process creation notification, thread creation notification, library file load (image load) notification, registry access callbacks, file system access callbacks, object manager callbacks (process and thread handle opening, duplication, etc.), virtual memory operation checks from user-mode hooks, user-mode hooks for endpoint protection, etc. Upon reaching a checkpoint in the execution/creation of a process, checkpoint engine 206 may receive or have access to a corresponding notification. Checkpoint engine 206 may then obtain the current security/access token of a process associated with the notification. Alternately, upon identifying a received notification, checkpoint engine 206 may compare the notification against one or more lists of events or "checkpoints." When the notification comparison matches a notification event with an event on a checkpoint list, checkpoint engine 206 may obtain the current security/access token of a process associated with the notification. In aspects, after obtaining the current security/access token of the process, checkpoint engine 206 may then evaluate the state of the current security/access token. In examples, evaluating the state of the current security/access token may comprise verifying the security/access token address or identifier, assessing processes and corresponding execution levels/privileges, identifying an integrity level of the security/access token, identifying an execution environment in which the process is running, etc. Based on the evaluation, checkpoint engine 206 may generate and/or transmit one or more indications of the evaluation. For example, checkpoint engine 206 may generate and store an evaluation report, or may send messages to one or more components of input processing unit 200.

Corrective action engine 208 may be configured to facilitate one or more corrective actions. In aspects, corrective action engine 208 may have access to the output or evaluations generated by checkpoint engine 206. Corrective action engine 208 may process the output/evaluations to determine whether one or more attributes or portions of the current security/access token have been modified. In examples, the processing may include comparing the attributes of the current security/access token to the attributes of an initial or previously-identified security/access token. Alternately, the processing may include comparing the attributes of the current security/access token to a default or predefined security/access token configuration. In aspects, if it determined that one or more attributes or portions of the current security token have been modified, corrective action engine 208 may perform (or cause the performance of) one or more corrective actions. Corrective actions may include generating warnings and/or notifications of the security token modification, removing the modified security token, replacing the modified security token with a previous version of the security token, terminating one or more corresponding processes, quarantining one or more files, executing anti-exploit software/services, etc.

Figure 3:
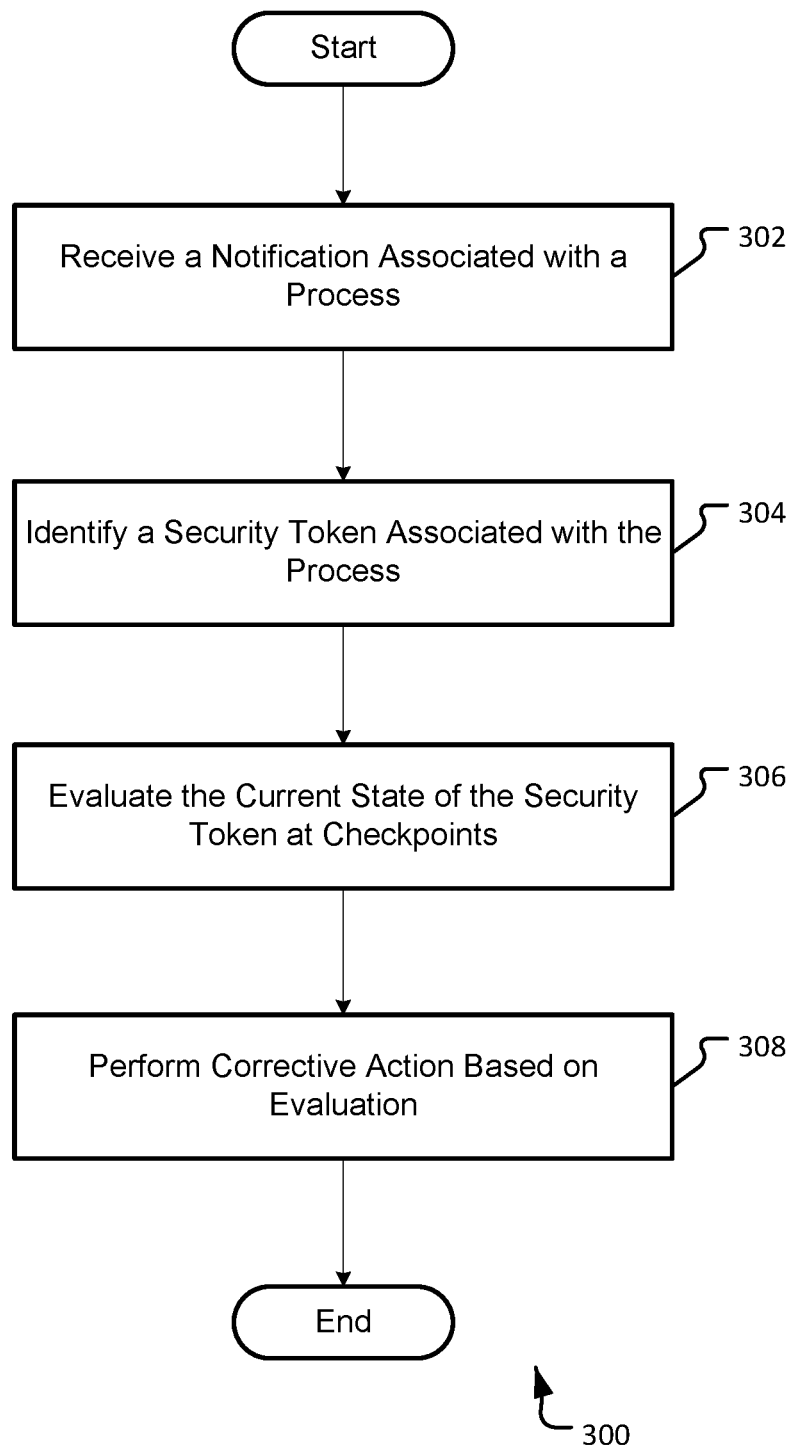
FIG. 3 illustrates an example method of monitoring the security privileges of a process as described herein.

FIG. 3 illustrates an example method for monitoring the security privileges of a process, as described herein. In aspects, method 300 may be executed by an exemplary system such as system 100 of FIG. 1. In examples, method 300 may be executed on a device comprising at least one processor configured to store and execute operations, programs or instructions. However, method 300 is not limited to such examples. In other examples, method 300 may be performed by a remote application or service for monitoring the security privileges of a process. In at least one example, method 300 may be executed (e.g., computer-implemented operations) by one or more components of a distributed network, such as a web service or distributed network service (e.g. cloud service).

Exemplary method 300 begins at operation 302 where a notification associated with a process is received. In aspects, a computing device may have access to a mechanism or component for registering for and receiving various notifications, such as notification registration engine 202. For example, the computing device may have access to an anti-exploit application or service comprising a kernel driver. The kernel driver may be configured to register for and receive various notifications from the operating system of the client device. Such notifications may indicate the creation of processes and threads, the loading of DLLs, file system and registry activity, process- and thread-handling events, virtual memory operations, etc. As one example, a kernel driver may receive a process creation notification message from a process management function when a corresponding process is created. The notification may comprise various information related to the process (e.g., creation date/time, originating application/service, user/device identifier, process flags/parameters, execution environment information, etc. The notification may additionally or alternately comprise a security token (or access token) associated with a security context describing a set of credentials for a process (or the user that created the process).

At operation 304, a security token may be identified and/or obtained. In aspects, a received notification may be detected by a component of the computing device, such as security token processing engine 204. In response to detecting a received notification, a security token for one or more processes corresponding to the notification may be identified and/or obtained. Identifying the security token may include parsing the received notification, accessing a security token data store, accessing a token generating or token issuing authority, or the like. After identifying a security token, the security token may be processed. Processing the security token may comprise determining and tracking the security token address or identifier, identifying the initial privilege level granted by the token, identifying an initial integrity level of the token, identifying an execution environment identifier, etc. For example, the kernel driver described above obtain and track the logical address of a received token, determine whether the process is executing as "system" or "administrator," determine a trustworthiness value for the security token and/or the process, and identify an application container in which the process is being executed.

At operation 306, the current state of a security token may be evaluated. In aspects, the current state of a security token may be evaluated periodically or at various checkpoints. Examples of checkpoints may include process creation notification, thread creation notification, library file load (image load) notification, registry access callbacks, file system access callbacks, object manager callbacks (process and thread handle opening, duplication, etc.), virtual memory operation checks from user-mode hooks, user-mode hooks for endpoint protection, etc. For instance, the kernel driver described above may receive a function call or method call to verify the current state of a security token. In response, an evaluation component, such as checkpoint engine 206, may evaluate the current attributes and/or state of a security token associated with a process. The evaluation may comprise verifying the current security/access token address or identifier, assessing processes and corresponding execution levels/privileges, identifying a current integrity level of the security token, identifying a current execution environment in which the process is running, etc. The state of a security token may then be compared to a previous or default state of the security token or to a previous/default state of a security token initially associated with the process. If it determined that the state or memory address of the current security token has been modified from a previous/default state of the security token, the security token may be designated as stolen or altered. As a result, a warning or notification indicating the modification to the security token may be generated.

At optional operation 308, one or more corrective actions may be performed. In aspects, a correction component, such as corrective action engine 208, may access information indicating a modification to the security token. In response, the correction component may perform (or cause the performance of) one or more corrective actions. Corrective actions may include generating and displaying warnings and/or notifications of the security token modification, removing the modified security token, replacing the modified security token with a previous version of the security token, terminating one or more corresponding processes, creating new processes with "safe" security tokens, quarantining one or more files, initiating (locally or remotely) anti-exploit software/services, etc. For example, if the kernel driver described above determines that a security token has been stolen or modified without authorization, the kernel driver may terminate the corresponding process and display a warning of a potential breach.

Figure 4:
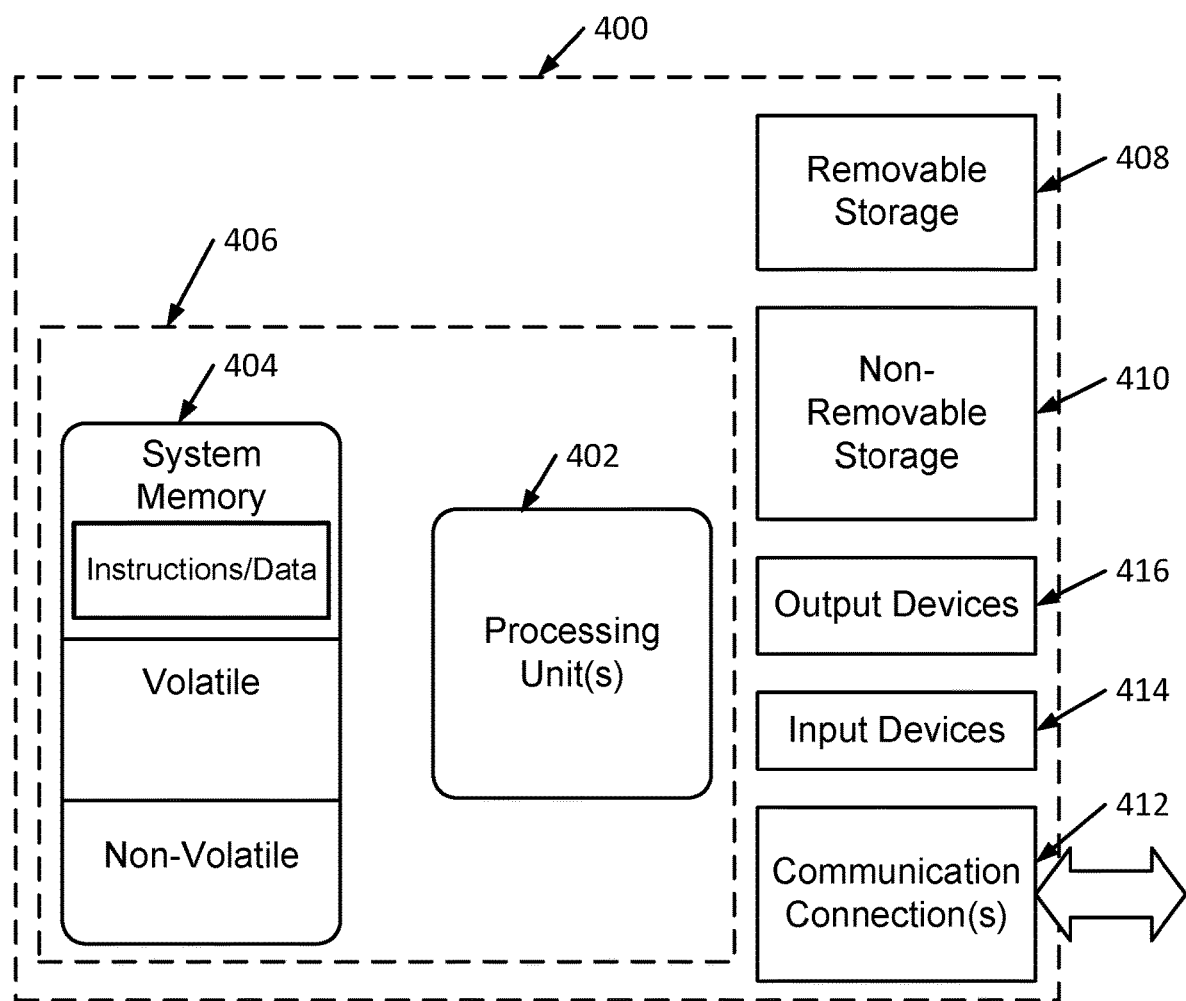
FIG. 4 illustrates one example of a suitable operating environment in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, notification data, anti-exploit code/data, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method comprising:
   receiving a notification associated with a process;
   identifying a security token associated with the process;
   evaluating a current state of the security token at one or more checkpoints and determining that the current state of the security token has been modified, wherein determining that the current state of the security token has been modified comprises identifying a privilege escalation exploit; and
   based on determining that the current state of the security token has been modified, performing one or more actions related to the process.

2. The system of claim 1, the method further comprising registering to receive the notification from an operating system of the system.

3. The system of claim 1, wherein the notification is indicative of at least one of: a creation of the process, a creation of a thread, a DLL loading event, or a system registry activity.

4. The system of claim 1, wherein identifying the security token comprises at least one of; parsing the notification, accessing a security token data store, or accessing a token issuing authority.

5. The system of claim 1, wherein the security token is associated with a security context describing a set of credentials for the process.

6. The system of claim 1, wherein identifying the security token comprises identifying an initial state of the security token.

7. The system of claim 6, wherein identifying the initial state of the security token comprises at least one of: determining an address of the security token, determining a privilege level of the security token, determining an integrity level of the security token, or determining a current execution environment executing the process.

8. The system of claim 6, wherein evaluating the current state of the security token comprises comparing the current state of the security token to the initial state of the security token.

9. The system of claim 1, wherein the one or more actions comprise at least one of: displaying warnings indicating the current state of the security token has been modified, deleting the security token, replacing the security token with a previous version of the security token, or terminating the process.

10. A method comprising:
    receiving a notification associated with a process;
    identifying a security token associated with the process, wherein the identifying comprises determining an initial state of the security token;
    evaluating a current state of the security token at one or more checkpoints and determining that the current state of the security token has been modified, wherein determining that the current state of the security token has been modified comprises identifying a privilege escalation exploit; and
    based on determining that the current state of the security token has been modified, performing one or more actions related to the process.

11. The method of claim 10, further comprising registering to receive the notification from an operating system of a computing device.

12. The method of claim 10, wherein the notification is indicative of the one or more checkpoints.

13. The method of claim 12, wherein the one or more checkpoints correspond to at least one of: a creation of the process, a creation of a thread, a DLL loading event, or a system registry activity.

14. The method of claim 10, wherein identifying the security token comprises at least one of: parsing the notification, accessing a security token data store, or accessing a token issuing authority.

15. The method of claim 10, wherein the security token is associated with a security context describing a set of credentials for the process.

16. The method of claim 15, wherein the security context for the process is associated with a low privilege for the initial state of the security token and a high privilege for the current state of the security token.

17. The method of claim 10, wherein the one or more actions comprise at least one of: displaying warnings indicating the current state of the security token has been modified, deleting the security token, replacing the security token with a previous version of the security token, or terminating the process.

18. A non-transitory computer readable media encoding computer executable instructions which, when executed by at least one processor, performs a method comprising:
    receiving a notification associated with a process;
    identifying a security token associated with the process, wherein the identifying comprises determining an initial state of the security token;
    evaluating a current state of the security token at one or more checkpoints and determining that the current state of the security token has been modified, wherein determining that the current state of the security token has been modified comprises identifying a privilege escalation exploit; and
    based on determining that the current state of the security token has been modified, performing one or more actions related to the process.

* * * * *